(12) United States Patent
Huber

(10) Patent No.: US 8,905,436 B2
(45) Date of Patent: Dec. 9, 2014

(54) ADJUSTABLE STEERING COLUMN FOR A MOTOR VEHICLE

(75) Inventor: Sebastian Huber, Göfis (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 247 days.

(21) Appl. No.: 13/580,220

(22) PCT Filed: Jan. 20, 2011

(86) PCT No.: PCT/AT2011/000034
§ 371 (c)(1),
(2), (4) Date: Aug. 21, 2012

(87) PCT Pub. No.: WO2011/100770
PCT Pub. Date: Aug. 25, 2011

(65) Prior Publication Data
US 2012/0318093 A1    Dec. 20, 2012

(30) Foreign Application Priority Data

Feb. 22, 2010 (DE) .......................... 10 2010 000 504

(51) Int. Cl.
*B62D 1/18* (2006.01)
*B62D 1/184* (2006.01)

(52) U.S. Cl.
CPC ..................................... *B62D 1/184* (2013.01)
USPC .............................. 280/775; 280/777; 74/493

(58) Field of Classification Search
USPC ..................................... 280/775, 777; 74/493
See application file for complete search history.

(56) References Cited

U.S. PATENT DOCUMENTS

| | | | | |
|---|---|---|---|---|
| 5,377,555 A | * | 1/1995 | Hancock | .......................... 74/493 |
| 5,555,772 A | * | 9/1996 | Schneider | ........................ 74/493 |
| 5,593,183 A | * | 1/1997 | Fouquet et al. | ................ 280/775 |
| 5,700,032 A | * | 12/1997 | Fukunaga | ..................... 280/775 |

(Continued)

FOREIGN PATENT DOCUMENTS

| | | |
|---|---|---|
| CN | 1942358 | 4/2007 |
| DE | 31 38 083 | 6/1982 |

(Continued)

OTHER PUBLICATIONS

International Search Report issued Apr. 13, 2011 in International (PCT) Application No. PCT/AT2011/000034.

(Continued)

*Primary Examiner* — Drew Brown
(74) *Attorney, Agent, or Firm* — Wenderoth, Lind & Ponack, L.L.P.

(57) ABSTRACT

The invention relates to an adjustable steering column for a motor vehicle including a clamping device, in the opened state of which the steering column is adjustable and in the closed state of which the set position of the steering column is fixed and which has an operating lever and a clamping pin having a longitudinal axis. A clamping part, which can be rotated by the operating lever about the longitudinal axis of the clamping pin in order to open and close the clamping device, is arranged on the clamping pin or is integrated with the clamping pin as one piece. The clamping pin and/or the clamping part includes a toothing, which surrounds the longitudinal axis of the clamping pin and the teeth of which extend in the direction of the longitudinal axis of the clamping pin.

10 Claims, 8 Drawing Sheets

(56) References Cited

U.S. PATENT DOCUMENTS

| | | | |
|---|---|---|---|
| 5,941,129 | A | 8/1999 | Anspaugh et al. |
| 6,082,216 | A | 7/2000 | Watanabe et al. |
| 7,125,046 | B2 | 10/2006 | Sawada et al. |
| 7,322,608 | B2 * | 1/2008 | Yamamoto et al. ........... 280/775 |
| 7,338,079 | B2 * | 3/2008 | Yamamoto ................... 280/775 |
| 7,415,908 | B2 * | 8/2008 | Zernickel et al. ............... 74/493 |
| 8,578,812 | B2 * | 11/2013 | Minamigata ................... 74/492 |
| 8,590,932 | B2 * | 11/2013 | Dietz et al. ..................... 280/775 |
| 2006/0213309 | A1 | 9/2006 | Zernickel et al. |
| 2007/0204714 | A1 | 9/2007 | Lutz |
| 2009/0188342 | A1 | 7/2009 | Cymbal et al. |
| 2010/0224145 | A1 | 9/2010 | Mueller |
| 2011/0041642 | A1 * | 2/2011 | Havlicek ........................ 74/493 |
| 2011/0064538 | A1 * | 3/2011 | Oertle et al. .................. 411/360 |

FOREIGN PATENT DOCUMENTS

| | | |
|---|---|---|
| DE | 43 45 099 | 7/1995 |
| DE | 101 41 551 | 3/2003 |
| DE | 10 2008 011 618 | 7/2009 |
| DE | 10 2008 011 620 | 10/2009 |
| EP | 1 741 945 | 1/2007 |
| EP | 1 747 966 | 1/2007 |
| FR | 2 779 698 | 12/1999 |
| GB | 2 087 808 | 6/1982 |
| GB | 2 299 844 | 10/1996 |
| JP | 2000-127987 | 5/2000 |
| WO | 03/018384 | 3/2003 |
| WO | 2004/069629 | 8/2004 |
| WO | 2009/105798 | 9/2009 |
| WO | 2009/141045 | 11/2009 |

OTHER PUBLICATIONS

Chinese Search Report (SR) issued Apr. 3, 2014 in corresponding Chinese Patent Application No. 2011800104965.

* cited by examiner

ADJUSTABLE STEERING COLUMN FOR A MOTOR VEHICLE

BACKGROUND OF THE INVENTION

The invention relates to an adjustable steering column for a motor vehicle with a clamping arrangement, in the opened state of which the steering column is adjustable and in the closed state of which the set position of the steering column is fixed, and which comprises an actuation lever and a clamp bolt having a longitudinal axis. A clamping part for opening and closing of the clamping arrangement is rotatable by the actuation lever about the longitudinal axis of the clamp bolt, and is disposed on the clamp bolt or is implemented integrally with it. The invention further relates to a method for securing an actuation lever of a clamping arrangement of an adjustable steering column for a motor vehicle on a clamp bolt and/or clamping part of the clamping arrangement, in the opened state of which the steering column is adjustable and, in the closed state of which the set position of the steering column is fixed and for the opening and closing of which the clamping part is rotatable by the actuation lever about the longitudinal axis of the clamp bolt.

Adjustable steering columns for motor vehicles are known in many different implementations. In a conventional implementation, the adjustability of the steering column is released or blocked by turning of an actuation lever about the longitudinal axis of a clamp bolt. A clamping part is rotated by the actuation lever about the axis of the clamp bolt, and the clamping part is formed, for example, by a cam disk cooperating with a cam follower disk. To secure the adjustment in the closed state of the clamping arrangement actuated by the actuation lever, friction faces, tightened against one another by the clamping arrangement for the securement under force closure, can for example be provided, or toothings joined by the clamping arrangement for a securement under form closure. The adjustability can refer to the axial direction of the steering column and/or the inclination or height adjustment.

An adjustable steering column is disclosed, for example, in DE 101 41 551 A1. The clamping arrangement comprises an actuation lever, a clamp bolt on which the actuation lever is turnably disposed, a clamping piece, also turnably disposed on the clamp bolt, in the form of a cam disk, and a cam follower disk cooperating therewith. The actuation lever is connected under form closure with the clamping piece through pins of the clamping piece which engage into recesses of the actuation lever. This form closure, for one, reliably ensures the positioning of the actuation lever and, for another, tranfers the force necessary for the opening and closing of the clamping arrangement from the actuation lever onto the clamping piece. To improve the protection of the motor vehicle driver in the event of a vehicle crash, a lever portion of the actuation lever is connected through a tearing mechanism with a bearing portion of the actuation lever via which the turnable bearing on the clamp bolt takes place. Through this mechanism, the lever portion can become detached from the bearing portion in the event of a crash.

In the adjustable steering column disclosed in EP 1 747 966 A2, the actuation lever is also connected under form closure with a cam disk, the cam disk including a rectangular projection pressed into a rectangular recess of the actuation lever. A cam follower disk, with respect to which the cam disk is turned by the actuation lever for opening and closing the clamping arrangement, comprises stops for the cams of the cam disk which, in the event of a crash, can be bent over. The cam disk, in the event of a crash, can thereby be further turned with respect to the cam follower disk whereby the turning of the actuation lever is also enabled in order to improve the driver protection in the event of a crash.

WO 2009/141045 A2 discloses an integral implementation of a clamping part, implemented in the form of a cam disk, with a clamp bolt of a clamping arrangement which serves for securing in position an adjustable steering column for a motor vehicle. On the side opposing the cam, a form contour is realized on the clamping part and the actuation lever is realized with an indentation having a corresponding form whereby a connection under form closure with the actuation lever is established. During the turning of the actuation lever, the clamping part, integrally implemented with the clamp bolt, is also turned simultaneously therewith.

Of disadvantage in these prior known steering columns is that the rotational orientation of the actuation lever with respect to the clamping part is defined at the outset, and potential tolerances of the structural parts lead to changed rotational settings of the actuation lever for the opened or closed state of the clamping arrangement. The assembly can also be complex depending on implementation if the actuation lever must be preassembled with the clamping part and the assembly must subsequently be mounted into the steering column assembly.

Further proposals for improving the protection of the vehicle driver in the event of a vehicle crash are disclosed in WO 03/018 384 A1 and U.S. Pat. No. 7,125,046 B2. In the first document, the actuation lever is implemented as a deformation element such that it is deformable by an impact with the consumption of energy. U.S. Pat. No. 7,125,046 B2 shows an adjustable steering column in which, in the event of a crash, the jacket tube can become shifted in the direction toward the vehicle front.

SUMMARY OF THE INVENTION

The invention addresses the problem of providing an adjustable steering column of the above described type through which simple implementation and assembly is enabled and in which the actuation lever is mountable in any angular position. This is attained according to the invention through an adjustable steering column with the features described below or through a method with the features described below.

In the steering column according to the invention, the actuation lever includes at least one joint face comprised of synthetic material which, in the assembled state of the steering column, encompasses the longitudinal axis of the clamp bolt. The clamp bolt and/or the clamping part includes at least one toothing which encompasses the longitudinal axis of the clamp bolt and whose teeth extend in the direction of the longitudinal axis of the clamp bolt (if the clamping part includes such a toothing, the disposition of the toothing about the longitudinal axis of the clamp bolt and the extending of the teeth refer to the completely assembled state of the steering column). The clamp bolt is pressed with the joint face or with a particular joint face onto the toothing of the clamp bolt and/or clamping part and the teeth of this toothing carve herein at least partially into the joint face or the particular joint face of the actuation lever. A connection under form closure is thereby formed which acts against a turning out of position of the actuation lever with respect to the toothing about the axis of the clamp bolt. Advantageously, further, a connection under force closure is implemented which acts against a shifting of the actuation lever with respect to the toothing in the axial direction of the clamp bolt. An additional lock nut screwed onto the clamp bolt against the axial pulling-off of the actuation lever can be provided.

The actuation lever can overall be comprised of synthetic material. The implementation of only one part of the actuation lever that comprises the at least one joint face of synthetic material is also feasible.

In a feasible embodiment form of the invention, the actuation lever can be pressed onto a toothing of the clamping part realized as a separate part and the clamping part and the actuation lever can be jointly supported thereon such that they are rotatable about the longitudinal axis of the clamp bolt. The torsion-tight disposition on the clamp bolt is also feasible.

In a different feasible embodiment, the actuation lever can be pressed onto a toothing of the clamp bolt such that the clamp bolt is simultaneously turned when the actuation lever is turned and the transfer of the swiveling of the actuation lever is transmitted onto the clamping part via the clamp bolt. For this purpose, the clamping part can be connected torsion-tight with the clamp bolt or it can be implemented integrally therewith.

In the case in which the clamping part is implemented as a part separate from the clamp bolt and is connected torsion-tight with the clamp bolt, it is preferred that the clamping part is pressed onto a toothing of the clamp bolt which encompasses the longitudinal axis of the clamp bolt and whose teeth extend in the direction of the longitudinal axis of the clamp bolt. The teeth of the toothing are at least partially carved into a joint face of the clamping part which face encompasses the clamp bolt. The actuation lever and the clamping part are herein advantageously pressed onto different axial sections of the same toothing of the clamp bolt. The joint face of the clamping part is preferably implemented of metal.

Through the implementation according to the invention, the rotational orientation of the actuation lever can be freely determined and is also not subject to any positional registration as would be the case through potential engagements of toothings implemented on both parts and meshing one into the other. A very simple assembly is enabled in which the steering column is preassembled and after the assembly of the remaining parts of the clamping arrangement the actuation lever is pressed on in the desired rotational orientation.

The force and form closure of the actuation lever with respect to the at least one toothing, which is at least partially carved into the at least one joint face comprised of synthetic material of the actuation lever, must be sufficiently strong for it to be able to transfer the actuation forces of the actuation lever for opening and closing the clamping arrangement. Forces occurring in cases of misuse must also be able to be absorbed to an adequate extent.

The force and form closure of the actuation lever with respect to the at least one toothing on which it is fastened is advantageously laid out such the actuation lever is turnable out of position about the longitudinal axis of the clamp bolt with respect to the clamping part if a limit value of a torque acting between the actuation lever and the clamping part is exceeded. If a torque exceeds the limit value, synthetic material in the proximity of the joint face, into which the teeth of the toothing are at least partially carved, is sheared off whereby the actuation lever can turn with respect to the toothing about the longitudinal axis of the clamp bolt. For the event of a vehicle crash, an advantageous protection for the vehicle driver can thereby be provided. In the favorable case, the actuation lever remains disposed on the clamp bolt or the clamping part even if the limit value of the torque is exceeded, e.g. the actuation lever is only able to move within a degree of freedom, just in the sense of a rotation about the longitudinal axis of the clamp bolt.

The limit value of the torque, above which the actuation lever is turnable out of position with respect to the clamping part, is preferably at least 7.5 Nm, a value of at least 12 Nm being preferred. To obtain sufficient safety even in the event of misuse, limit values of the torque, above which the actuation lever is turnable with respect to the clamping part, of at least 15 Nm are especially preferred.

The adjustable steering column according to the invention can, in a conventional manner, comprise a bracket unit, connectable with the chassis of the motor vehicle, and a setting unit rotatably bearing supporting the steering spindle. The setting unit in the opened state of the clamping arrangement is adjustable with respect to the bracket unit for setting the position of the steering column and, in the closed state of the clamping arrangement, is secured in position in its set position with respect to the bracket unit. This setting unit can, in particular, be formed by a jacket tube rotatably bearing supporting the steering spindle or it can comprise such.

If upon exceeding the limit value of the torque acting between the actuation lever and the clamping part, the actuation lever turns out of position with respect to the clamping part, the clamping arrangement preferably remains closed. Thus, the clamping part does not turn since it is stayed against a turning out of position by a corresponding stop which is in particular disposed on the counter-clamping part. If the clamping arrangement consequently remains tightened, the steering column according to the layout of the clamping arrangement can absorb forces with respect to its adjustment directions. These forces can in particular be laid out to be of such magnitude that the steering column, in the event of a crash, is not dislocated with respect to the bracket unit through an impact of the driver and, for example, the function of the airbag is fully ensured. In this way, on the one hand, the endangerment through the actuation lever is decreased and, on the other hand, the energy at the impact of the driver onto the steering column, such as is known in prior art, can be absorbed under control by absorption elements between bracket unit and body-stationary mounting.

In the opened state of the clamping arrangement, the steering column can be adjustable in its longitudinal direction and/or in its inclination or height.

If a torque acting between the actuation lever and the clamping part exceeds the limit value, this is denoted as "a crash event". As long as this limit value has not been exceeded, this is considered "normal operation" of the steering column.

Within the scope of this document, the term "toothing" is to be broadly understood. The teeth can have different tapered or also rounded forms. Such teeth can be introduced in a different manner, for example by milling or also by material reformation, in particular through knurling or longitudinal knurling.

BRIEF DESCRIPTION OF THE DRAWINGS

Further advantages and details of the invention will be explained in the following in conjunction with the attached drawings, in which.

DETAILED DESCRIPTION OF THE INVENTION

Figure 1:
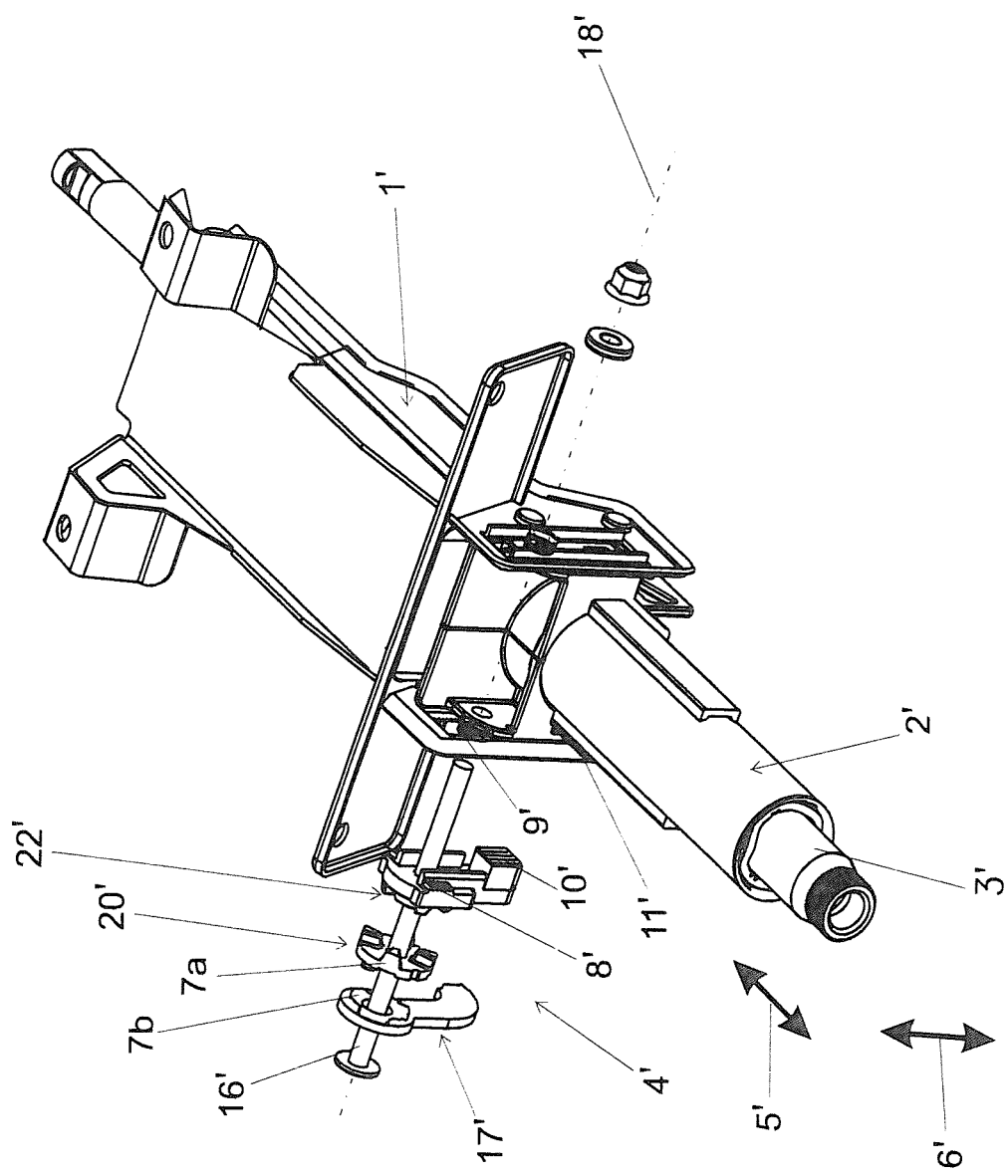
FIG. 1 is an oblique view of a steering column according to the prior art, in a partially pulled-apart depiction.

FIG. 1 shows an adjustable steering column according to the prior art. In the opened state of a clamping arrangement 4' a setting unit 2', bearing supporting the steering spindle 3' rotatably with respect to a chassis-stationary bracket unit 1', is adjustable in the longitudinal direction 5' and in the setting direction 6' of height or inclination adjustment and, in the closed state of the clamping arrangement 4', the setting unit 2' is secured in position with respect to the bracket unit 1' through meshing toothings 8' to 11'. For opening and closing, the clamping arrangement 4' serves an actuation lever 17' rotatably disposed on a clamp bolt 16' of the clamping arrangement, which, for this purpose, turns a clamping part 20', implemented in the form of a cam disk, about the longitudinal axis 18' of the clamp bolt 16'. The clamping part 20' cooperates with a counter-clamping part 22' implemented in the form of a cam follower. For the torsion-tight connection between the actuation lever 17' and the clamping part 20', this counter-clamping part 22' comprises projections 7a which engage into indentations 7b of the actuation lever 17'.

Figure 2:
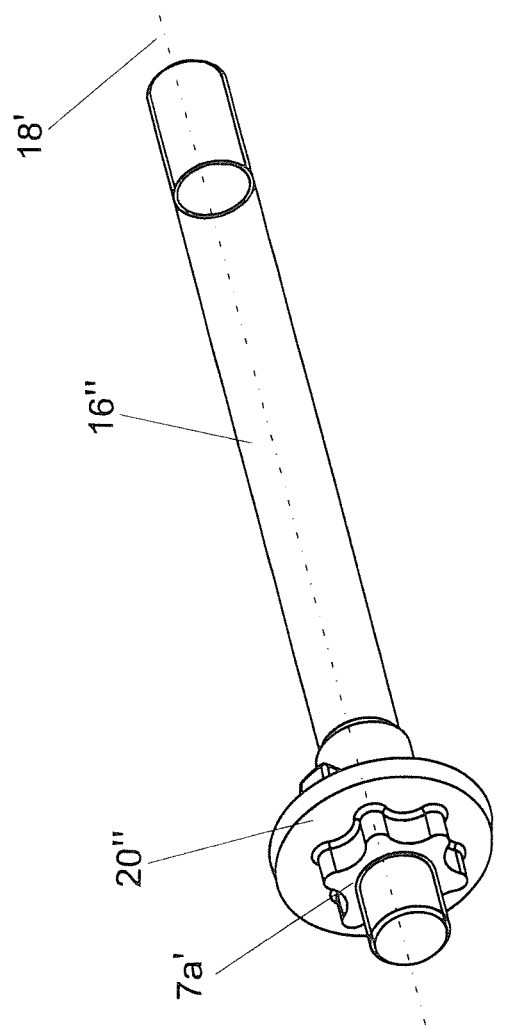
FIG. 2 shows a modified clamp bolt with a formed-on clamping part for alternative use in the steering column of FIG. 1, also according to the prior art.

FIG. 2 shows a modified implementation according to the prior art. The clamping part 20" is here implemented integrally with the clamp bolt 16", thus is formed thereonto. On the side remote from the cams 21, a projection 7a' is implemented with a cross section deviating from the circular form, which projection engages into a corresponding indentation in the actuation lever.

A first embodiment of the invention is depicted in FIGS. 3 to 9. Apart from the actuation lever 17, clamping part 20 and clamp bolt 16, the implementation is identical to that of the steering column according to prior art of FIG. 1.

Figure 3:
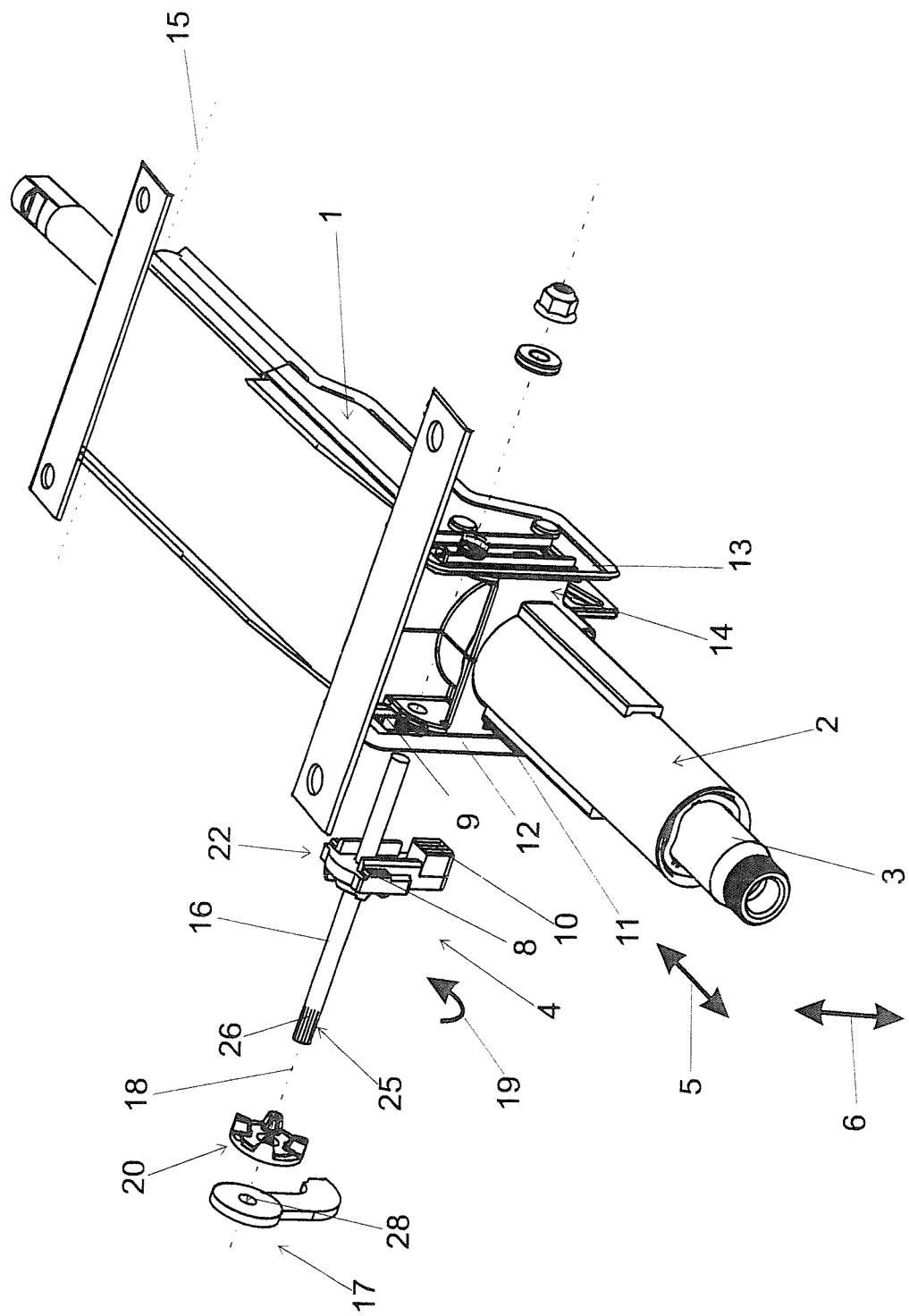
FIG. 3 shows a first embodiment of a steering column according to the invention in an oblique view and in partially pulled-apart depiction.

The steering column depicted in FIG. 3 comprises a bracket unit 1 connectable to the chassis of the motor vehicle, and a setting unit 2 bearing supporting a section of the steering spindle 3 adjoining the steering wheel-side end of the steering column. The setting unit 2 is implemented in the form of a jacket tube.

In the opened state of a clamping arrangement 4, the setting unit 2 is adjustable in the longitudinal direction 5 of the steering column (=in the direction of the longitudinal axis of the steering spindle 3) for a length adjustment of the steering column and in the adjustment direction 6 for a height or inclination adjustment of the steering column with respect to the bracket unit 1. In the closed state of the clamping arrangement 4, the set position of the setting unit 2 is secured in position with respect to the bracket unit 1. For the securement in position of the adjustment serve, for example, as depicted, meshing toothings 8 to 11. For the securement in position, friction faces could, instead, also be provided. Other securement elements acting under form closure are also known and could be employed. For the securement in position, further, combinations of elements acting under form and friction closure could also be employed. To increase the number of friction faces, lamellae cooperating in the manner of lamellae couplings can also be provided. The toothings and/or other securement elements can also be provided on one or on both sides with respect to the longitudinal center axis. All of these implementations are known.

The setting unit 2 is disposed between side jaws 12, 13 of the bracket unit 1. In the depicted embodiment, further, between the bracket unit 1 and the setting unit 2 an intermediate unit 14 is disposed. In the opened state of the clamping arrangement 4, the intermediate unit 14 is adjustable with respect to the bracket unit 1 in the setting direction 6 corresponding to the height or inclination adjustment. For this purpose, it is swivellable with respect to the bracket unit 1 about a swivel axis 15 the implementation of which is not depicted in detail in the embodiment shown. In the longitudinal direction 5 of the steering column, the intermediate unit 14 is nondisplaceable with respect to the bracket unit 1. In the opened state of the clamping arrangement 4, further, the setting unit 2 is adjustable in the longitudinal direction 5 with respect to the intermediate unit 14 for the length placement of the steering column. In the setting direction 6, the setting unit 2 is nonadjustable with respect to the intermediate unit 14.

In the closed state of the clamping arrangement 4, the side jaws 12, 13 of the bracket unit 1 are tightened against the intermediate unit 14.

It is herein feasible to form the connection of the bracket unit 1 with the chassis of the motor vehicle, and/or the connection of the intermediate unit 14 with the bracket unit 1, and/or the connection of the setting unit 2 with the intermediate unit 14 by interspacing known crash energy absorption devices. Since the energy absorption of the steering column in the event of a crash is not the core of the invention, such mechanisms are not further depicted here. However, the person of skill in the art can select using his discretion suitable mechanisms from energy absorption engineering and, combined with the solution according to the invention, integrate them into a steering column.

The implementation with a bracket unit 1, setting unit 2 and interspaced intermediate unit 14 in the described form is known. Such an intermediate unit 14 could also be omitted, as is also known. In the closed state of the clamping arrangement 4 the side jaws 12, 13 are in this case pressed directly onto the setting unit 2.

The clamping arrangement 4 comprises a clamp bolt 16 extending transversely to the steering spindle 3, in particular at right angles to the longitudinal direction 5 of the steering column, which penetrates openings in the side jaws 12, 13. To enable the height or inclination adjustment, the openings in the side jaws 12, 13 penetrated by the clamp bolt 16 are realized as elongated holes extending in the setting direction 6. The clamp bolt 16, further, penetrates openings in the intermediate unit 14. It could also penetrate through openings in the setting unit 2, in particular in physical forms in which an intermediate unit 14 is omitted. To enable a length adjustment of the steering column, these openings in the setting unit 2 would be implemented as elongated holes extending in the longitudinal direction 5.

A steering column according to the invention could also be adjustable only in the length direction 5 or only in the setting direction corresponding to the height or inclination adjustment.

To open and close the clamping arrangement 4, an actuation lever 17 actuatable by the user is swiveled about the longitudinal axis 18 of the clamp bolt 16. Through the form-closure connection, to be described below, of the actuation lever 17 with the clamp bolt 16, the actuation lever 17 herein entrains the clamp bolt 16, and thus the clamp bolt also rotates about its longitudinal axis 18. Through the torsion-tight connection, also described below, between the clamp bolt 16 and a clamping part 20 disposed thereon this part is also rotated about the longitudinal axis 18 of the clamp bolt 16 when the actuation lever 17 is swiveled. In the depicted embodiment, the clamping part 20 is implemented in the form of a cam disk with at least one cam 21, preferably at least two cams 21.

The clamping part 20 cooperates with a counter-clamping part 22, which is held nonturnably about the longitudinal axis 18, in the depicted embodiment by guide bars 23, which are guided by the side jaw 12 (for example the margins of openings penetrated by the clamp bolt 16, on which they are in contact) such that they are displaceable into the setting direction 6. The counter-clamping part 22 in the depicted embodiment is implemented in the form of a connecting link disk or a cam follower and comprises at least one oblique face 24 for the cooperation with the at least one cam 21 of clamping part 20.

During the turning of the clamping part 20 into the rotational closure direction 19 from the open position into the closed position of the clamping arrangement 4, the ends of the clamping part 20 and of the counter-clamping part 22 remote from one another, referred to the longitudinal axis 18 of the clamp bolt 16, are further spaced apart from one another. Consequently, at least one of these parts 20, 22 is shifted into the axial direction of the longitudinal axis 18.

The opening and closing of a clamping arrangement 4 in this manner by a clamping part 20 and counter-clamping part 22 is known. It is also feasible to provide the converse disposition, e.g. that the counter-clamping part 22 comprises at least one cam and the clamping part 20 is implemented as a connecting link disk or cam follower and includes at least one oblique face for the cooperation with the at least one cam. In addition, other implementations of clamping parts 20, 22 for opening and closing the clamping arrangement 4 through the axial shift of at least one of these parts during the turning of the clamping part 20 with respect to the counter-clamping part 22 are conceivable and feasible and also known. Thus, between the clamping part 20 and the counter-clamping part 22, rocker arms or rolling bodies could be disposed which run in guide tracks of which at least one includes an inclined bottom.

When the clamping arrangement 4 is closed, the further turning of the clamping part 20 into the rotational closure direction 19 is blocked. In the depicted embodiment, for this purpose the at least one cam 21 is in contact on a stop of the counter-clamping part 22.

Figure 4:
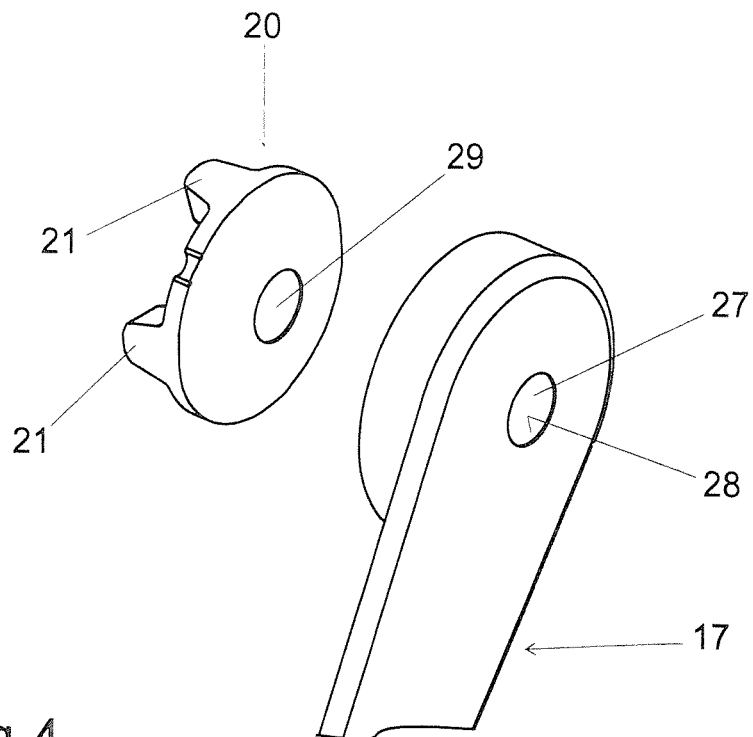
FIGS. 4 and 5 are oblique views of the clamping part and show a portion of the setting lever in greater detail.
Figure 5:
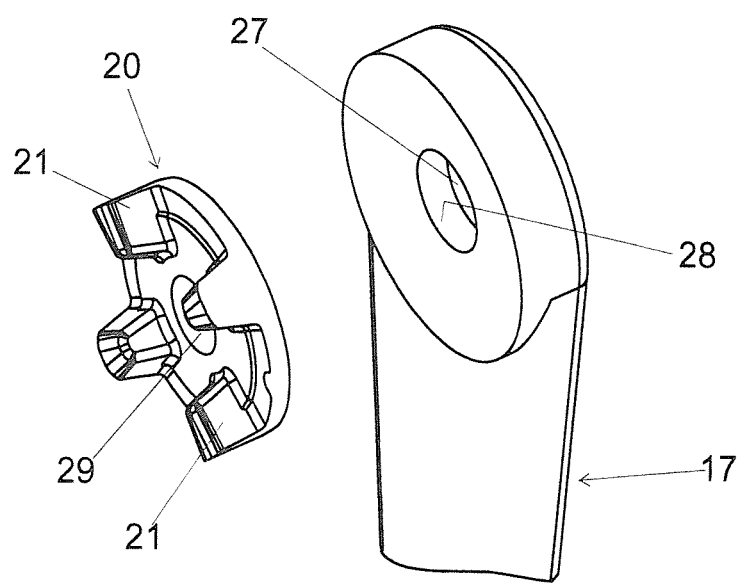
Figure 6:
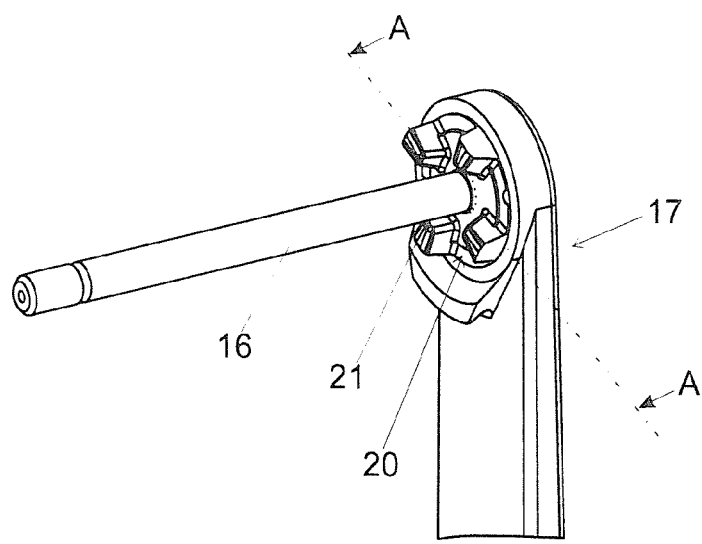
FIG. 6 is an oblique view of the clamp bolt with the clamping part and setting lever mounted thereon.
Figure 7:
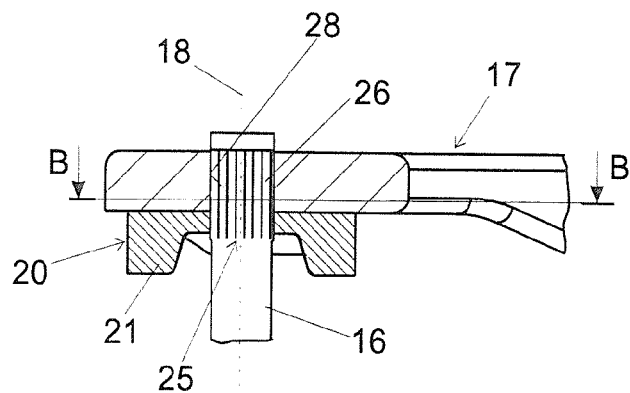
FIG. 7 is a section along line AA of FIG. 6.

In FIG. 3 are evident the clamp bolt 16, the actuation lever 17 and the clamping part 20 in the state in which they are still separated from one another. The counter-clamping part 22 is already disposed on the clamp bolt 16 and a round hole in the counter-clamping part 22 is penetrated by the clamp bolt 16 with minimal play such that the clamp bolt 16 is turnable about its longitudinal axis 18 with respect to the counter-clamping part 22. FIGS. 4 and 5 show the clamping part 20 and a portion of the actuation lever 17 in greater detail.

The clamp bolt 16 comprises at its outer circumference a toothing 25 which, consequently, encompasses the longitudinal axis 18 of the clamp bolt 16. The teeth 26 of the toothing extend parallel to the longitudinal axis 18. The actuation lever 17 is comprised of synthetic material and includes a through-opening 27 with circular cross section. Before it is pressed onto the toothing 25, the diameter of the through-opening 27 is minimally smaller than the outer diameter of the toothing 25, for example smaller by a value between the height of the teeth 26 and the two-fold height of the teeth 26.

In the region surrounding the through-opening 27, the actuation lever 17 can be implemented thickened referred to the axial direction of the clamp bolt 16, as is shown in FIGS. 4 and 5, wherein the thickening can be realized integrally with the remaining portion of the actuation lever 17 or it can be formed by a separate part rigidly connected with the remaining portion of the actuation lever 17.

Figure 8:
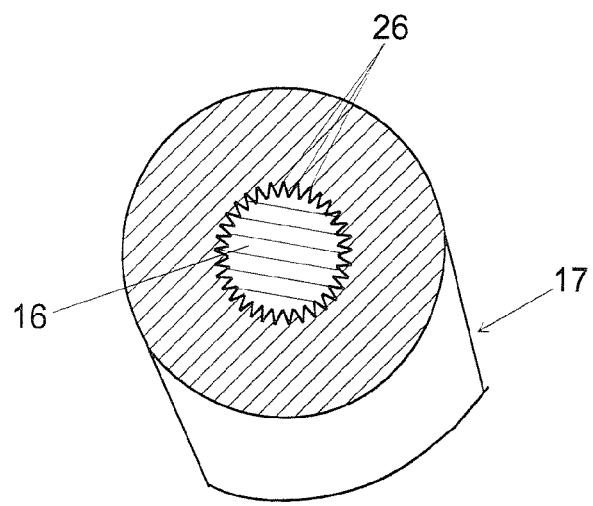
FIG. 8 is a section along line BB of FIG. 7.

For the joining of the actuation lever 17 with the clamp bolt 16, the actuation lever 17 is pressed in the direction of the longitudinal axis 18 of the clamp bolt 16 onto the toothing 15. Hereby the teeth 26 of the toothing are carved, at least over a portion of their height, into the joint face 28 of the actuation lever 17 formed by the shell surface of the through-opening, as is depicted in FIG. 8. Thereby, a connection is established which acts under form closure in the circumferential direction, via which the clamp bolt 16 is connected torsion-tight with the actuation lever 17.

To facilitate the axial pressing of the actuation lever 17 onto the toothing 25, the toothing 25 and/or the through-opening 27 can be provided with a bevel which forms a run-up inclination (not depicted in the Figures).

After the actuation lever 17 has been pressed onto the toothing 25, the connection also acts under force closure such that the actuation lever 17 is secured against being axially pulled off the clamp bolt 16.

The clamping part 20 in the embodiment is also connected torsion-tight with the clamp bolt 16. For this purpose, the clamping part 20, which preferably is overall comprised of metal, is pressed with a through-opening 29 onto a section of the toothing 25, which is axially adjacent to the section of the toothing 25 on which the actuation lever 17 is pressed on. The teeth 26 of the toothing 25 during the axial pressing-on of the clamping part 20 carve more or less into the shell surface of the through-opening 29, whereby a connection is established between the clamping part 20 and the clamp bolt 16 which acts under form closure in the circumferential direction. The connection is also a force closure such that the clamping part 20 is secured against an axial shifting on the clamp bolt 16. Alternatively, the clamping part 20 can also be connected with the clamp bolt 16 in a different manner, for example through welding, adhesion, pressing-on or using an assembly method. A combination of joining methods is also conceivable and feasible.

The clamp bolt 16 rotated by the actuation lever 17 during the opening and closing of the clamping arrangement 4, consequently by the rotation of the actuation lever 17, also turns the clamping part 10 such that the latter turns with respect to the counter-clamping part 22.

Figure 9:
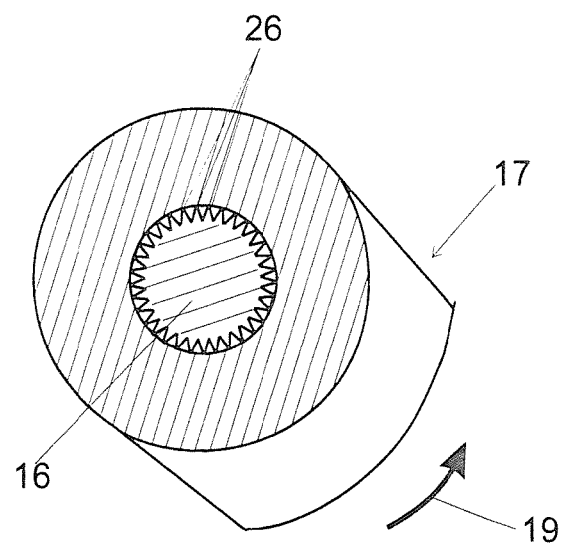
FIG. 9 is a section corresponding to FIG. 8, wherein, in the event of a crash, a turning of the actuation lever with respect to the clamp bolt takes place.

If, between the actuation lever 17 and the clamp bolt 16, a torque acts which exceeds a specific limit value, shearing-off of the projection of synthetic material that remained standing between the teeth 26 carved into the synthetic material of the actuation lever 17 by the teeth 26 occurs and the actuation lever 17 turns with respect to the clamp bolt 16. This is depicted in FIG. 9. Such a torque occurs in particular in the event of a vehicle crash if, through the secondary collision of the driver, a sufficiently high force is exerted by him onto the actuation lever 17. This force in general is more or less directed toward the vehicle front. The torque exerted onto the actuation lever 17 acts into the rotational closure direction 19 and the actuation lever 17 swivels into the rotational closure direction 19, with the clamping arrangement herein remaining closed such that the set position of the steering column is retained. The actuation lever 17 also remains disposed on the clamp bolt 16 even after the turning out of position with respect to the clamping part 20.

Figure 10:
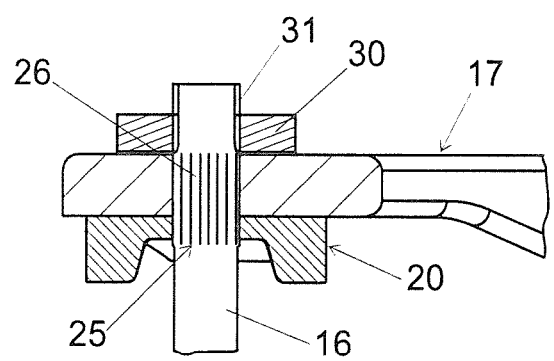
FIGS. 10 and 11 are depictions corresponding to FIG. 7 of two embodiment forms modified with respect to the first embodiment.
Figure 11:
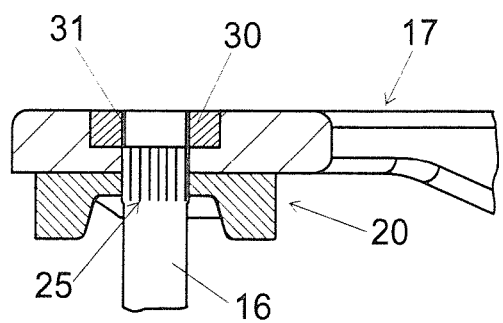

For the additional securement of the actuation lever 17 against being axially pulled off the clamp bolt 16, a lock nut 30 can be provided as is depicted in FIGS. 10 and 11. The toothing 25 ends at a spacing from the end of the clamp bolt 16 and between the toothing 25 and the adjacent end of the clamp bolt 16 this is provided with a threading 31 onto which the lock nut 30 is screwed. In the embodiment form of FIG. 10, this nut is in contact on the side face of the actuation lever 17. In the embodiment form of FIG. 11, the side face of the actuation lever 17 is provided with an indentation in which the lock nut 30 is flush-mounted.

Figure 12:
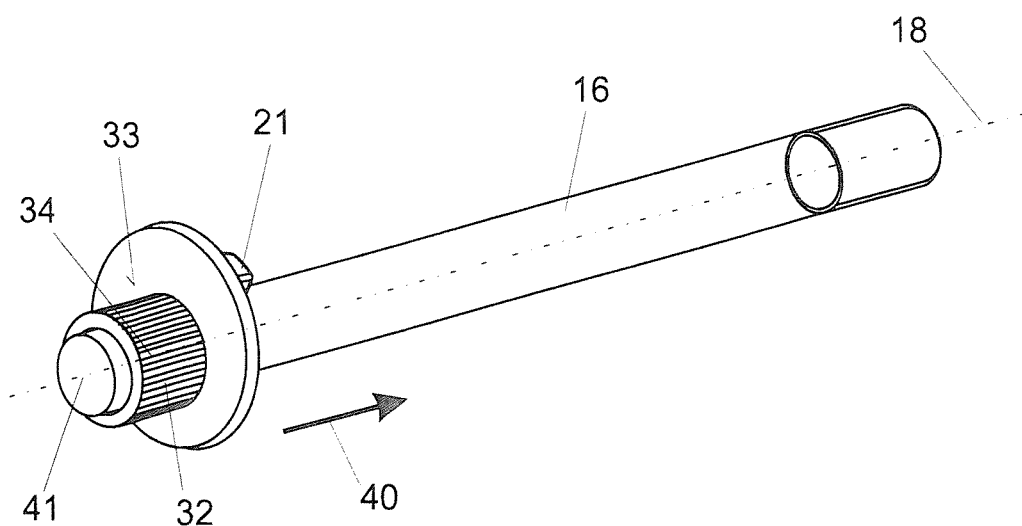
FIG. 12 is an oblique view of a clamp bolt with a clamping part secured thereon according to a fourth embodiment form of the invention.
Figure 13:
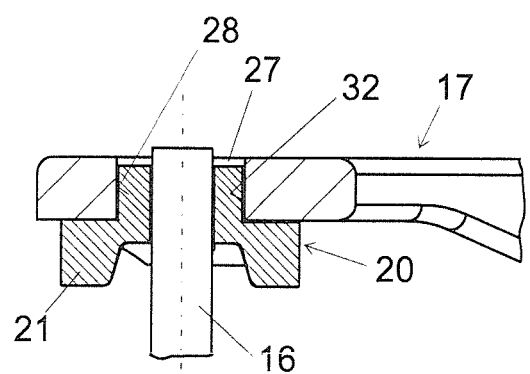
FIG. 13 is a depiction corresponding to FIG. 7 of this fourth embodiment form of the invention.

A further embodiment form of the invention is depicted in FIGS. 12 and 13. Apart from the following differences, the implementation is the same as in the previously described embodiment forms. Analogous parts are provided with the same reference symbols as before.

The clamping part 20 is again torsion-tight connected with the clamp bolt 16, for example in the previously described manner. Alternative joining methods, such as for example explained in other embodiment variants, are here also conceivable and feasible. The clamping part 20 could here also be, for example, welded together with the clamp bolt 16. The clamping part 20 includes here a sleeve-like extension 32 in the axial direction of clamping part 20 that is penetrated by the clamp bolt 16. The outer surface of the extension 32 is provided with a toothing 33 whose teeth 34 extend in the axial direction of the clamp bolt 16. The toothing 33 encompasses the longitudinal axis 41 of the clamping part 20 and, thus, subsequently in the mounted state of the clamping part 20, the longitudinal axis 18 of clamp bolt 16 coincides with the longitudinal axis 41 of the clamping part 20.

The actuation lever 17 comprised of synthetic material is, as previously, provided with a through-opening 27 circular in cross section. The diameter of the through-opening 27 is minimally smaller than the outer diameter of the toothing 33, for example smaller by a value between the height of the teeth 34 and the two-fold height of teeth 34. The shell surface comprised of synthetic material of the through-opening 27 forms a joint face 28 with which the actuation lever 17 is pressed onto the toothing 33, wherein the teeth 34 carve more or less into the joint face 28. The direction 40 in which the actuation lever 17 is pressed on is indicated in FIG. 12 by an arrow.

In this embodiment, the actuation lever 17 is consequently connected torsion-tight directly with the clamping part 20 and the actuation forces exerted onto the actuation lever 17 are transferred directed onto the clamping part 20. This torsion-tight connection is preferably destroyed again in the event of a crash when a limit value of the torque is exceeded, such that the actuation lever 17 is turnable out of position by the driver with respect to the clamping part 20, in a manner entirely analogously to that of the embodiment forms of FIGS. 3 to 11.

When the clamping part 20 and the actuation lever 17 on the clamp bolt 16 are at the end faces secured against axial shifting, for example through a head of the clamp bolt 16 or through a stop nut, the clamping part 20 and the actuation lever 17 could in this embodiment also be jointly turnable with respect to the clamp bolt 16. During the opening and closing of the clamping arrangement 4, the clamp bolt 16 would, consequently, not be rotated simultaneously.

In a further embodiment, the clamping part 20 could also be implemented integrally with the clamp bolt 16, thus be formed thereon. The clamp bolt 16 with the formed-on clamping part 20 could, for example, be implemented in the manner depicted in FIG. 12.

Figure 14:
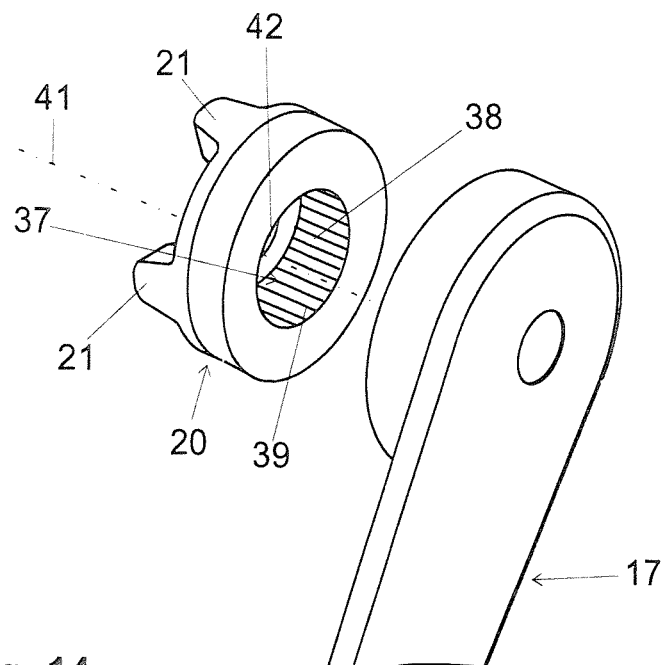
FIG. 14 is an oblique view of the clamping part and a portion of the actuation lever according to a fifth embodiment form of the invention.
Figure 15:
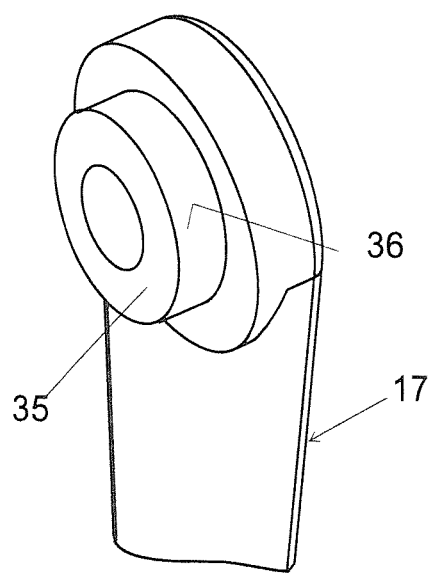
FIG. 15 is an oblique view of a portion of the actuation lever according to the fifth embodiment form of the invention from, compared to FIG. 14, different directions of sight.

A further embodiment of the invention is depicted in FIGS. 14 and 15. Again, the torsion-tight connection of the actuation lever 17 takes place directly with the clamping part 20. The actuation lever 17 comprised of synthetic material includes here a pin-shaped extension 35 in the axial direction of the clamp bolt 16. Its outer surface forms here a joint face 36 onto which the toothing 37 of the clamping part 20 is pressed axially. The toothing 37 is here implemented as an inner toothing and disposed on the shell surface of an indentation 38 in the clamping part 20. In the mounted state of the steering column, the toothing 37 encompasses again the longitudinal axis 18 of the clamp bolt 16, and the teeth 39 of the toothing 37 extend in the mounted state of the steering column in the direction of the longitudinal axis 18 of the clamp bolt 16. The clamping part 20 is comprised of metal. The outer diameter of the extension 35, circular in cross section, is minimally larger than the inner diameter of the toothing 37, for example larger by a value between the height of teeth 34 and the two-fold height of teeth 34, wherein the teeth 39 during the axial pressing-on of the clamping part 20 carve more or less into the joint face 36.

According to this embodiment, the clamping part 20 can be connected with the clamp bolt 16 using a joining method or be disposed such that it is supported rotatably about the clamp bolt 16. For this purpose, the clamping part 20 can include a recess 42 adjoining the indentation 38 in the longitudinal axis 41 of the clamping part 20. This recess 42 can be implemented as a support for the bearing on the clamp bolt 16 or as securement section for the securement on the clamp bolt. The clamping part can, alternatively, also be implemented integrally with the clamp bolt.

Different modifications of the depicted embodiments are conceivable and feasible without leaving the scope of the invention. Thus, the actuation lever could, for example, also only be partially comprised of synthetic material, for example only in a section in the proximity of the joint face 28, 36.

As the synthetic material, of which the actuation lever 17 is at least comprised in the proximity of the joint face 28, 36, can be utilized a fiber glass-reinforced synthetic polyamide material, for example PA66GF50.

The toothing 25, 33, 37, onto which the actuation lever 17 is pressed, can be realized in various manner, for example through a milling process or by knurling. Different tooth forms with tapered or rounded teeth can be utilized.

It would, for example also be conceivable and feasible for the actuation lever 17 to have a first joint face comprised of synthetic material, with which the actuation lever 17 is pressed onto a toothing of the clamp bolt, and a second joint face comprised of synthetic material with which the actuation lever 17 is pressed onto a toothing of the clamping part.

To the extent it is functionally applicable, the elements of the embodiments can also be differently combined with one another without leaving the scope of the invention. For embodiments, in which such is not explicitly shown, a lock nut 30, for example, can also be provided for the axial securement without leaving the scope of the invention.

LEGEND TO THE REFERENCE NUMBERS

1, 1' Bracket unit
2, 2' Setting unit
3, 3' Steering spindle 4, 4' Clamping arrangement
5, 5' Longitudinal direction
6, 6' Setting direction
7a, 7a'7b Indentation Projection
8, 8' Toothing
9, 9' Toothing
10, 10' Toothing
11, 11' Toothing
12 Side jaw
13 Side jaw
14 Intermediate unit
15 Swivel axis
16, 16', 16" Clamp bolt
17, 17' Actuation lever
18, 18' Longitudinal axis
19 Rotational closure direction
20, 20', 20" Clamping part
21 Cam
22, 22' Counter-clamping part
23 Guide bar
24 Oblique face
25 Toothing
26 Tooth
27 Through-opening
28 Joint face
29 Through-opening
30 Lock nut
31 Threading
32 Extension
33 Toothing
34 Tooth
35 Extension
36 Joint face
37 Toothing
38 Indentation
39 Tooth
40 Direction of pressing-on
41 Longitudinal axis
42 Recess

The invention claimed is:

1. An adjustable steering column for a motor vehicle comprising:
  a clamping arrangement, in an opened state of which the steering column is adjustable, and, in a closed state of which, a set position of the steering column is fixed;
  an actuation lever;
  a clamp bolt having a longitudinal axis; and
  a clamping part disposed on the clamp bolt or implemented integrally therewith and being rotatable by the actuation lever about the longitudinal axis of the clamp bolt so as to open and close the clamping arrangement,
  wherein:
  at least one of the clamp bolt and the clamping part includes a toothing that encompasses the longitudinal axis of the clamp bolt and whose teeth extend in the direction of the longitudinal axis of the clamp bolt,
  the actuation lever includes a joint face comprised of synthetic material which encompasses the longitudinal axis of the clamp bolt and is pressed onto the toothing of at least one of the clamp bolt and the clamping part, such that the teeth of the toothing are at least partially carved into the joint face of the actuation lever, and
  the joint face of the actuation lever has a cylindrical shape and encompasses the longitudinal axis around its complete circumference.

2. The adjustable steering column as in claim 1, wherein the clamping part is connected torsion-tight with the clamp bolt.

3. The adjustable steering column as in claim 2, wherein the clamping part is pressed onto the toothing of the clamp bolt which encompasses the longitudinal axis of the clamp bolt and whose teeth extend in the direction of the longitudinal axis of the clamp bolt, wherein the teeth of the toothing are at least partially carved into the joint face, encompassing the clamp bolt, of the clamping part.

4. The adjustable steering column as in claim 1, wherein the clamping part and the actuation lever are bearing supported on the clamp bolt such that they are jointly rotatable about the longitudinal axis of the clamp bolt.

5. The adjustable steering column as in claim 1, wherein the actuation lever comprises synthetic material.

6. The adjustable steering column as in claim 1, wherein the clamping part comprises metal.

7. The adjustable steering column as in claim 1, wherein the actuation lever, if a limit value of a torque acting between the actuation lever and the clamping part is exceeded, is turnable out of position with respect to the clamping part into at least one rotational direction about the longitudinal axis of the clamp bolt.

8. The adjustable steering column as in claim 1, wherein the actuation lever is rotatable about the longitudinal axis in a rotational closure direction and the clamping part is entrained by the actuation lever in the rotational closure direction, wherein the clamping part in the closed state of the clamping arrangement is blocked against a further rotation in the rotational closure direction.

9. The adjustable steering column as in claim 1, further comprising a counter-clamping part, wherein the clamping part cooperates with a counter-clamping part held nonturnably out of position with respect to the longitudinal axis of the clamp bolt, wherein the clamping part and the counter-clamping part during the opening and closing of the clamping arrangement is displaced or are displaced in the axial direction of the clamp bolt.

10. A method for securing in position an actuation lever of a clamping arrangement of an adjustable steering column for a motor vehicle on at least one of a clamp bolt and clamping part of the clamping arrangement in an opened state of which the steering column is adjustable and, in a closed state of which, the set position of the steering column is fixed and, for the opening and closing of which, the clamping part is rotatable by the actuation lever about the longitudinal axis of the clamp bolt, said method comprising:
  providing at least one of the clamp bolt and the clamping part with a toothing encompassing the longitudinal axis of the clamp bolt or of the clamping part, the toothing having teeth extending in the direction of the longitudinal axis of the clamp bolt or of the clamping part; and
  pressing an actuation lever with a joint face comprised of a synthetic material onto the toothing of at least one of the clamp bolt and the clamping part such that the teeth of the toothing are carved at least partially into the joint face of the actuation lever, wherein the joint face of the actuation lever has a cylindrical shape and encompasses the longitudinal axis of the clamp bolt or of the clamping part around its complete circumference.

* * * * *